Aug. 31, 1954  R. R. PURCELL  2,687,592
CASTING APPARATUS
Filed April 3, 1950  4 Sheets-Sheet 1
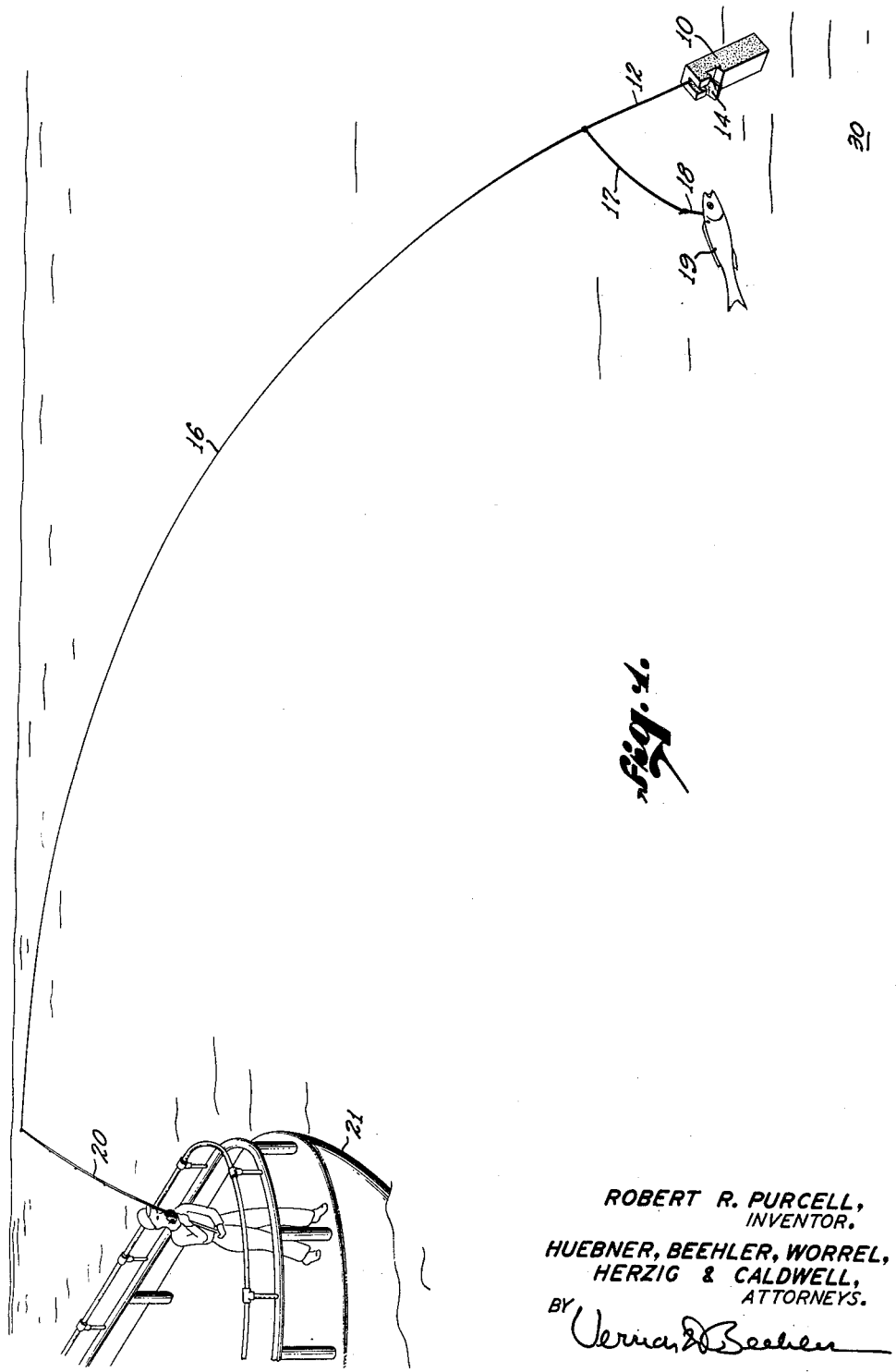
ROBERT R. PURCELL,
INVENTOR.
HUEBNER, BEEHLER, WORREL,
HERZIG & CALDWELL,
ATTORNEYS.
BY Aug. 31, 1954
R. R. PURCELL
2,687,592
CASTING APPARATUS
Filed April 3, 1950
4 Sheets-Sheet 2
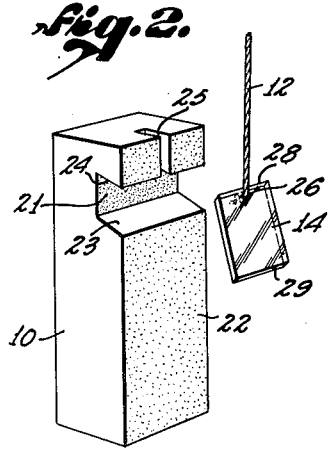
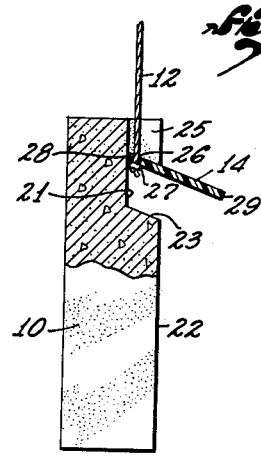
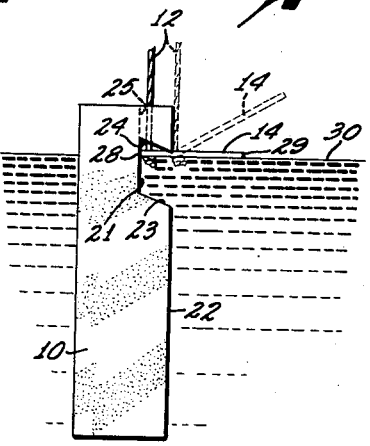
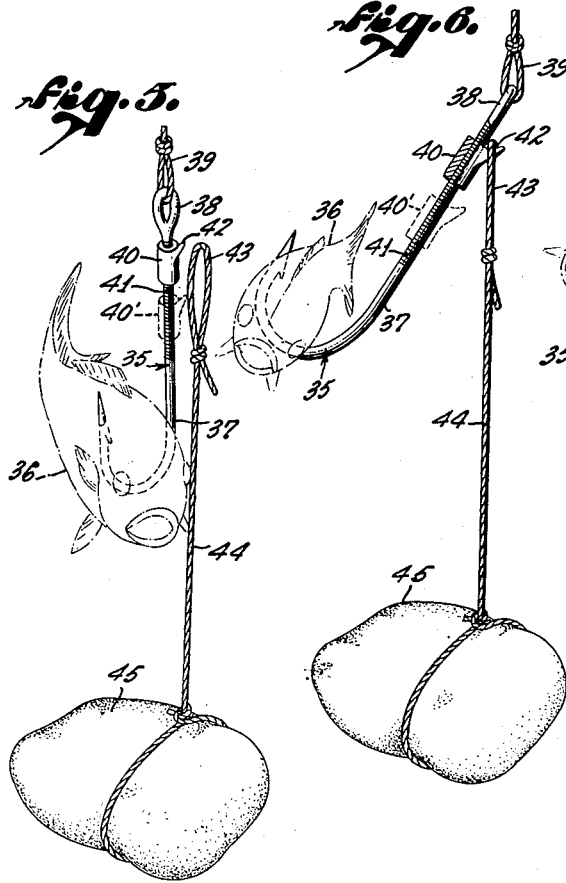
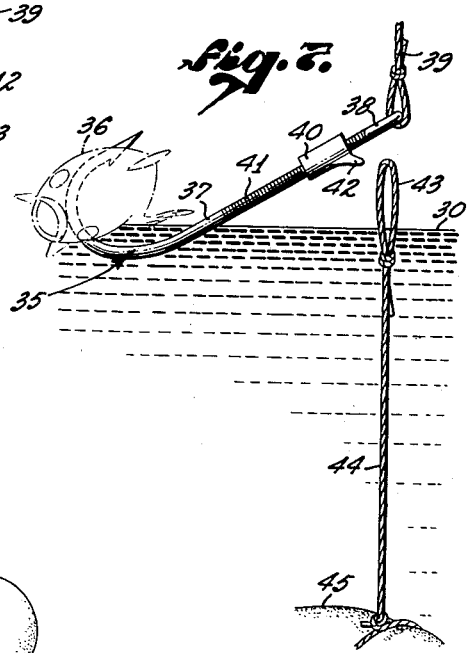
ROBERT R. PURCELL,
INVENTOR.
HUEBNER, BEEHLER, WORREL,
HERZIG & CALDWELL,
ATTORNEYS.

Aug. 31, 1954 — R. R. PURCELL — 2,687,592
CASTING APPARATUS
Filed April 3, 1950 — 4 Sheets-Sheet 3
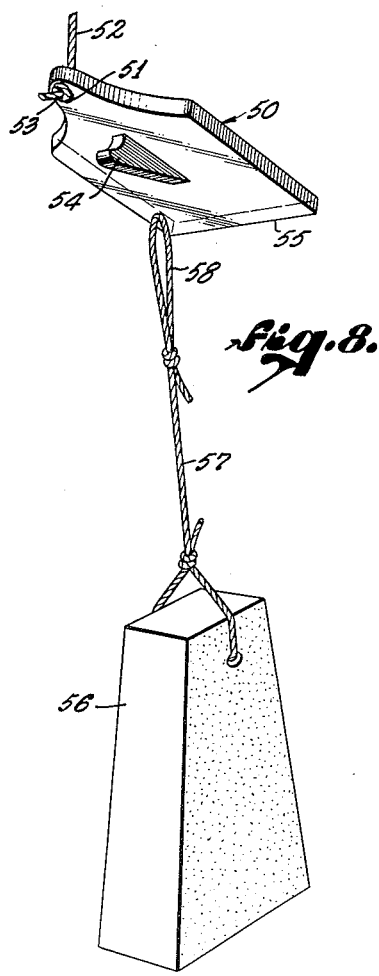
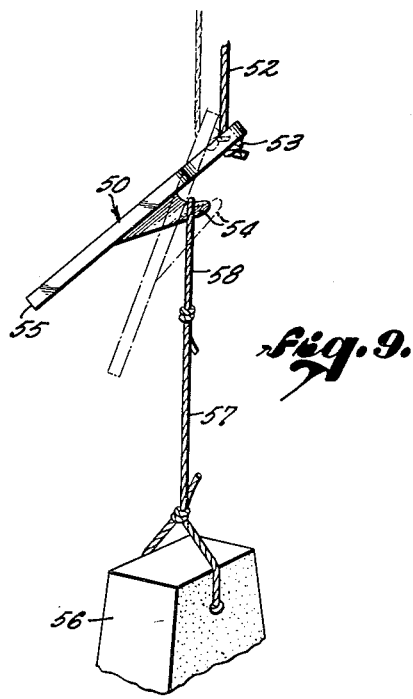
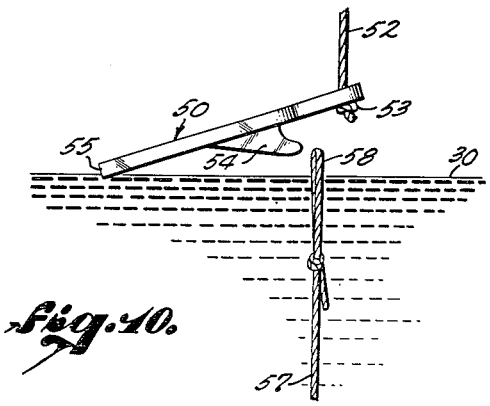
ROBERT R. PURCELL,
INVENTOR.
HUEBNER, BEEHLER, WORREL,
HERZIG & CALDWELL,
ATTORNEYS.

Aug. 31, 1954  R. R. PURCELL  2,687,592
CASTING APPARATUS
Filed April 3, 1950  4 Sheets-Sheet 4
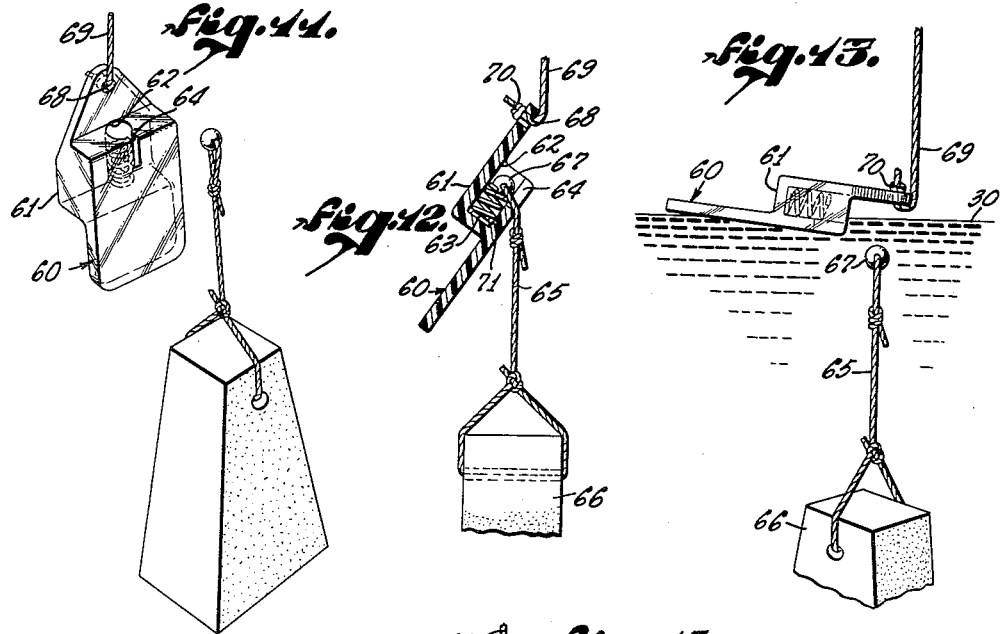
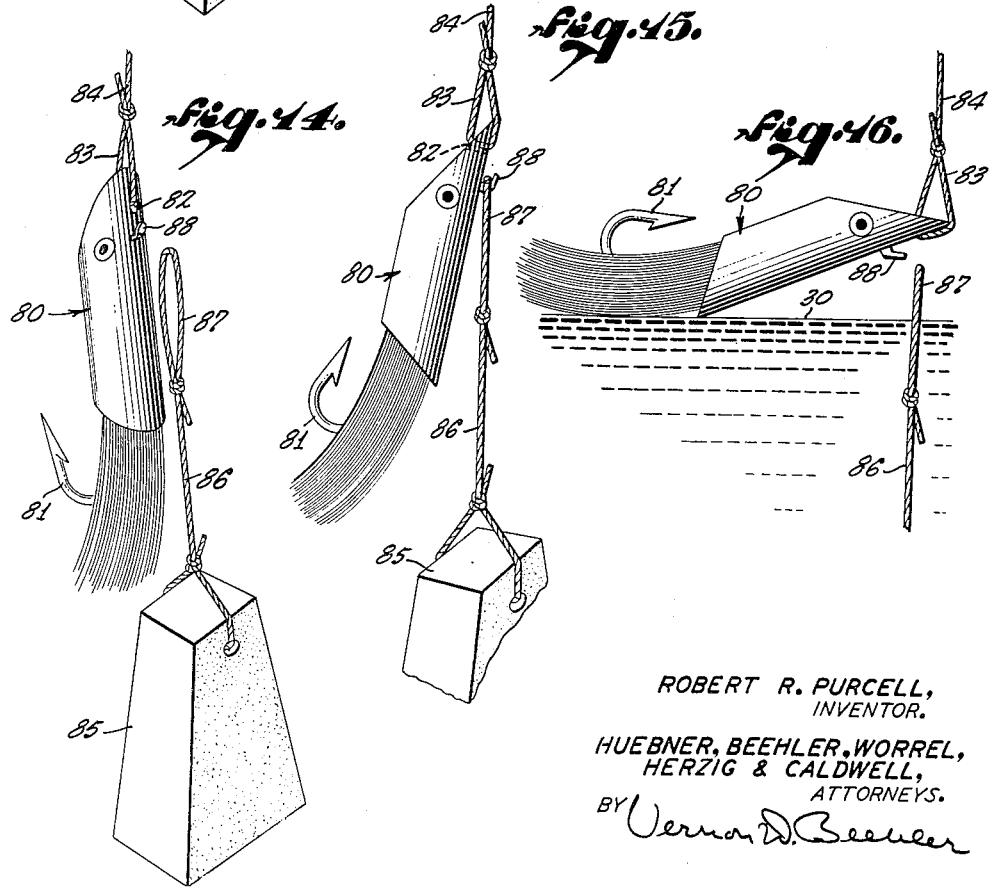
ROBERT R. PURCELL,
INVENTOR.
HUEBNER, BEEHLER, WORREL,
HERZIG & CALDWELL,
ATTORNEYS.

Patented Aug. 31, 1954

2,687,592

UNITED STATES PATENT OFFICE 2,687,592

CASTING APPARATUS

Robert R. Purcell, Rosemead, Calif.

Application April 3, 1950, Serial No. 153,691

8 Claims. (Cl. 43—43.12)

The application relates to casting apparatus for use on fishing tackle and has particular reference to the provision of means for releasably attaching a weight to assist in casting the bait as far away from the fisherman as possible, the releasing means being so arranged that upon contact with the water the weight is released and the bait remains free to float or swim at the surface.

It has been appreciated that for many kinds of fishing it is desirable to cast the bait as far from the fisherman as possible. Certain kinds of fishing, however, demand that the bait remain near the surface. This is true when fishing with live bait but is also true when fishing with certain types of lures. It is frequently true also that the bait, whether it be a live bait or a lure, is light in weight and because of the lightness in weight cannot be cast as far from the fisherman as might be desirable. On the other hand, if weight is added to the end of the line to which the bait is affixed, the weight in turn will be so heavy that it will pull the bait to the bottom rather than permit it to remain near the surface.

In recognition of this factor in fishing various means have been provided for releasing the weight or sinker attached to the line. These means have had their disadvantages in that they have been slow to operate and have caused the bait to sink unnecessarily a substantial distance before the sinker or weight is released. Because of this many of the advantages of a disposable sinker have been counter-balanced by the disadvantages.

It is therefore among the objects of the invention to provide a new and improved casting apparatus by means of which a disposable sinker or casting weight can be quickly and positively released from the fishing line as quickly as the line hits the water.

Another object of the invention is to provide a new and improved casting apparatus featuring a disposable sinker or casting weight which is particularly inexpensive to manufacture and which at the same time is easy to operate under all conditions.

Still another object of the invention is to provide a new and improved casting apparatus particularly well adapted to live bait fishing and so arranged that the sinker in no way interferes with the live bait of the line either while the bait is being cast outwardly from the fisherman or from the boat occupied by the fisherman or after the bait strikes the water.

Still another object of the invention is to provide a new and improved disposable casting weight apparatus so constructed that the releasable attachment even though made sensitive is at the same time adjustable to any one of a number of different kinds of bait or lure or further still to any one of a number of different bait sizes.

Also included among the objects is to provide a new and improved casting apparatus adapted to employ a disposable sinker or casting weight so arranged that the apparatus can be readily used with conventional fishing tackle.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a schematic representation showing the manner in which the casting apparatus is used in connection with deep sea fishing.

Figure 2 is a perspective view of one form of the device showing the sinker or casting weight in a position ready for reception of the deflector plate which forms a means of anchoring the weight to the line or tackle and which at the same time provides an automatic release.

Figure 3 is a side elevational view partly in section showing the sinker attached to the deflector plate.

Figure 4 is a perspective elevational view showing the parts in the positions they would occupy immediately after the sinker strikes the surface of a body of water.

Figure 5 is a perspective view of a second form of the invention showing the sinker releasing device incorporated in a baited hook with the sinker ready for attachment.

Figure 6 is a view similar to Figure 5, portions being broken away, showing the baited hook with a disposable sinker attached thereto.

Figure 7 is a view similar to Figures 5 and 6 showing the baited hook and sinker released therefrom immediately after the baited hook strikes a body of water.

Figure 8 is a perspective view of another form of the device showing an individual deflector adapted to be attached to a leader or line including releasable means for securing a sinker thereto.

Figures 9 and 10 respectively show the embodiment of Figure 8 with a sinker attached to the deflector and a sinker released therefrom after the apparatus strikes the water.

Figures 11, 12 and 13 show still another modified form of the apparatus in three successive positions, namely, prior to affixing the sinker thereto, then in a position ready for casting, and finally in a released position.

Figures 14, 15 and 16 show the same sequence of views as Figs. 11, 12 and 13, respectively, wherein the invention is incorporated into an artificial lure or fly.

In deep sea fishing it is usually the custom to employ a boat by means of which a group of fishermen can travel a substantial distance from the shore to locations where sufficient quantities of fish can be found. Upon reaching a suitable location fish are frequently lured into the vicinity of the boat by a process called chumming. Chumming as it is commonly practiced consists of throwing a quantity of bait into the water near the boat to attract fish into the immediate vicinity of the boat. This is usually necessary because by use of tackle ordinarily available it is not possible for individual fishermen to cast the bait on their lines very far from the boat. While trolling may be practiced for certain types of fish, other types of fish can be caught more readily by still fishing near a boat in deep water.

As so frequently occurs there are many lines used at one time from a single boat. During the course of a day's fishing with many persons casting their bait from a rather confined space, lines are apt to become tangled either during the casting or during the pulling in of fish which have taken the bait.

On the other hand, because there is a practical limit to the distance a fisherman can cast ordinary fishing tackle from the boat, the area which can be fished from a single boat is quite limited and consequently the number of fish which can be taken by the tackle however numerous it may be is limited by that limited area. Therefore, it becomes advantageous to provide some means for casting the bait in this kind of fishing as far from the boat as possible in all directions so that a larger area can be fished and so that shoving need not be resorted to.

It will be appreciated further that other types of fishing may also advantageously employ a disposable casting weight to carry the bait far from the fisherman as, for example, during surf fishing or fishing from a wharf where better fishing conditions are experienced at a substantial distance from the location which the fisherman is able to occupy.

For various reasons it is undesirable to permanently attach a sinker or casting weight to the end of a fishing line carrying the bait and hook.

The type of fishing contemplated to be enjoyed by use of the apparatus of this invention is fishing which can be most productive of a good catch when the bait floats at or near the surface. To make a long successful cast it is, on the other hand, necessary to use a reasonably heavy sinker or weight. Consequently, when such a weight is used it should be released just as quickly as the bait strikes the water. At the same time if a disposable sinker is to be used, it must be one capable of being purchased at an extremely low price because of the fact that the bait must be cast a great many times during the course of a day's fishing and each time the bait is cast the sinker is lost.

In one embodiment of the invention illustrated in Figures 2, 3 and 4 there is shown a weight or sinker 10 designed to be releasably attached to a line or leader 12 which carries on the end a deflector 14. The leader 12 can be any convenient length as illustrated in Figure 1, for example, and attached to a fishing line 16 at the end of which a second leader 17 is also attached carrying a hook 18 upon which live bait 19 is fastened. The fishing line as illustrate1 is attached to a fish rod 20 manipulated from the deck of a boat 21.

In the particular embodiment shown in Figures 2, 3 and 4 the sinker or casting weight 10 may be made of some inexpensive material such as plaster of Paris wherein a great many weights can be cast at one time and milled or sawed to proper size and with the necessary configurations to make from the sinkers detachable casting weights.

The sinker 10, as illustrated, is provided with a recess 21 extending inwardly from one side 22 of the sinker. The recess is formed by opposite side walls 23 and 24.

A passage 25 extends from the recess at the wall 24 inward to the end of the sinker nearest the recess.

The deflector plate 14 is shown as provided with an eye or aperture 26 through which the leader 12 may be passed so that a knot 27 tied at the end of the leader prevents the leader from being pulled through the eye. It will be noted particularly that the eye is very close to one edge 28 of the deflector and at a substantial distance from an opposite edge 29.

In use the deflector is engaged beneath the wall 24 in a position such that the knot 27 is on the side of the deflector remote from the wall and so that the wall 24, being tilted outwardly and diagonally away from the adjacent end of the sinker, causes the deflector to be similarly tilted. This relationship makes certain that the sinker will remain attached to the deflector and the leader as long as the weight of the sinker pulls against the leader. The pull will be exerted while the weight is being swung about before making the cast.

As soon as the sinker hits the surface 30 of a body of water it plunges beneath the surface and almost instantaneously the downwardly directed face of the deflector strikes the surface of the water with sufficient force to flip it out of the recess 21. This immediately disengages the sinker from the deflector and the leader, and the sinker sinks to the bottom. The bait is therefore left free to float at the surface.

In the form of the invention illustrated in Figures 5, 6 and 7 there is shown a baited hook 35, the bait being here illustrated as a large minnow 36. The barbed hook portion is substantially conventional in design.

The hook is provided witth a shank 37 at the upper end of which is an eye 38 to which a line or leader 39 may be attached.

Upon the shank 37 there is mounted a collar 40 so constructed that initially it is adapted to slide up and down along the shank. A second position is illustrated by the dotted line 40' and is one of a number of different positions which the collar can occupy.

If need be the shank may be roughened as by use of creases 41 in order that the collar may take a tighter hold upon the shank should it be pinched at a desired position of adjustment.

The collar is provided with a projection 42 which in effect forms engaging means for reception of a loop 43 formed in a short length of line 44 which in turn may be tied to any one of a number of different kinds of sinkers 45.

Among the particular advantages of a releasing device of the kind shown in Figures 5, 6 and 7 is that it can be used with bait of different kinds or different weights. In order for the sinker to be promptly and positively released, the deflection of the hook must take place immediately upon striking the water. If the bait is relatively light, then the release of the sinker must be sensitive. To make it sensitive, the collar 40 must be located near the top of the shank 37. If it is not sufficiently sensitive, the sinker or casting weight will not be released as the bait and the hook strike the surface of the water. It will be understood that in this embodiment the bait itself assists in deflecting the position of the hook when the hook strikes the surface of the water.

On the other hand, if the live bait on the hook be relatively heavy, then the releasing device must be less sensitive for otherwise the sinker might be released before it should strike the surface of the water. To make the releasing mechanism less sensitive, the collar 40 is moved farther down along the shank 37 as, for example, to the dotted position 40'. In that position it can be clamped upon the shank by squeezing the collar so that it anchors itself to the shank. The collar will then be in the best position for casting relatively heavy live bait. The balance of the live bait will be compensated for by the lack of sensitivity and when the relatively heavier live bait strikes the surface of the water the hook will then be deflected sufficiently to release the disposable sinker.

In the embodiment illustrated in Figures 8, 9 and 10, still another form of the invention is disclosed. In this form a deflector plate 50 is illustrated provided with an eye or aperture 51 adjacent one edge designed for reception of the line or leader 52 which extends through the eye so that it can be knotted providing a knot 53, thereby holding the line fast to the deflector plate. On the same side of the deflector plate at which the knot 53 appears, there is provided a hook 54 located as illustrated substantially nearer the end of the deflector plate provided with the eye than an opposite end 55. It will further be appreciated that the portion of the deflector plate between the hook 54 and the edge 55 becomes a water-engaging face useful in releasing the sinker or casting weight.

In this embodiment also there is shown a sinker or casting weight 56 to which is attached a length of line 57 provided at the other end with a loop 58. The loop is shown in a position adapted for engagement with the hook 54. As suggested, the distance between the eye 51 and the hook 54 is substantially less than the distance between the hook 54 and the edge 55. The relative positioning of these parts will depend upon the sensitivity desired in the apparatus. That is to say, if a heavy sinker is to be used in order either to cast further or to compensate for the live or other bait used, the hook will need to be so positioned that the releasing mechanism is left sensitive. The size of the deflector plate 50 will also contribute to factors influencing the location of the hook with respect to the eye.

In this form of the invention with the sinker attached as shown, as soon as the deflector plate strikes the surface of the water, the water-engaging face will strike the surface of the water and thereupon tilt the deflector plate to a position wherein the loop 58 will be released and the sinker will then sink to the bottom, permitting the deflector plate and the bait to remain near the surface. It is further advantageous in using this type of deflector plate for a release that the deflector plate be made either of transparent material or material the color of which will be lost when the deflector plate floats or hangs in the water. This is desirable so that the deflector plate will not itself serve to attract fish.

Still another form of the invention is illustrated in Figures 11, 12 and 13. In this particular embodiment a deflector plate 60 is provided with an offset portion 61 of substantial thickness. In the offset portion is a recess 62 at the bottom of which may be provided a coiled spring 63. A passage 64 at the side of the recess and extending downwardly from the open end is adapted to receive a length of line 65 which is attached to a disposable sinker 66. At the end of the length of line 65 remote from the sinker there may be secured a bead 67 small enough so that it can be received in the recess 62. The deflector plate or deflector 60 is in this instance also provided with an eye 68 adapted to receive a leader 69 which has a knot 70 at the end to prevent the leader from pulling through the eye.

As suggested by the drawings and the previous description, when the sinker is to be attached to the deflector plate or deflector, the bead is pressed into the recess 62 against the resistance of the coiled spring 63 which may be relatively light. The weight of the sinker continues to pull the bead against the coiled spring as long as that weight remains effective. As the weight is swung preparatory to casting, the bead remains pressed against the spring within the recess. Thereafter as soon as the weight is released, which will occur when the sinker or casting weight strikes the water and the deflector is deflected, the force of the spring 63 will exert itself to eject the bead 67. A projection 71 may be provided in order to anchor the spring in place so that it does not leave the recess when it expands. Any convenient or conventional means for holding the spring in place may readily be employed. It will further be appreciated that the deflection of the deflector plate can be counted upon to assist in releasing the sinker upon contact of the deflector plate with the water. On the other hand, should either means be defective, the other can be counted upon to properly release the sinker. This action doubles the assurance that the cast will be effective.

In still another form of the invention, Figures 14, 15 and 16, a lure or plug bait 80 is employed. As illustrated, the plug includes a barbed hook 81 and is arranged with an eye 82 for reception of the loop 83 of a leader 84.

A disposable sinker or casting weight 85 is shown as previously described equipped with a length of line 86 at the end of which is a loop 87. The loop is designed to attach to a hook 88 on the body of the plug. The hook is located a short distance from the eye 82, the distance depending upon the sensitivity desired.

In this example the plug itself provides a means of deflecting the position of the hook 88 when the combined plug and sinker strikes the surface of the water, the parts assuming the position illustrated in Figure 16 in which position the sinker is released.

It will be understood from the various forms of the invention herein described that a particularly sensitive weight-releasing means has been provided which is certain and positive in its operation. The weight may be of any sort, either a weight such as a rock found on the shore, a casting of particular shape, or in fact any heavy object to which a length of line can be tied. The releasing portion is, on the other hand, attached at all times to the end of the fish line and is retrieved whenever the bait is drawn in. The sensitive releasing mechanism therefore is a permanent portion of the tackle and line and only the inexpensive weight is disposed with each cast.

With these and other objects in view, the invention consists in the construction, arrangement and combination of the various parts of the device whereby the objects contemplated are attained, as hereinafter set forth, pointed out in the appended claims and illustrated in the accompanying drawings.

Having described my invention, what I claim as new and desire to secure by Letters Patent is:

1. In a casting apparatus adapted for use with fishing tackle including a disposable sinker having a securing element thereon, a deflector having a point of attachment for the tackle and a releasable sinker-securing element on the deflector at a location adjacent said point of attachment for the tackle adapted for initial engagement with said securing element on the disposable sinker and remaining in said engagement to the completion of the forward movement of the sinker and deflector in the casting operation, said deflector moving to a deflected position when striking the water whereby the securing elements are released one from another to release the sinker.

2. In a casting apparatus adapted for use with a fishing line including a disposable sinker having a securing element thereon, a leader and bait-securing means, a release device having a point of attachment for the line, a releasable sinker-securing element on the release device at a location adjacent said point of attachment for the line adapted for initial engagement with said securing element on the disposable sinker and remaining in said engagement to the completion of the forward movement of the sinker and sinker-securing element in the casting operation, said release device having a deflecting portion at a location more remote from the point of attachment for the leader than said sinker-securing element on the release device and said deflecting portion being adapted when striking the water to deflect said release device to a position whereby the securing elements are released one from another to release the sinker.

3. In a casting apparatus adapted for use with a fish line the combination of a disposable sinker having a securing element thereon, and a release device having a point of attachment for the line, a releasable sinker-securing element on the release device at a location removed from said point of attachment for the line, said securing element on the disposable sinker being adapted for initial engagement with the sinker securing element and remaining in said engagement to the completion of the forward movement of the sinker and the sinker-securing element in the casting operation, and said release device having a deflecting portion at a location more remote from the point of attachment for the line than said sinker-securing element on the release device and said deflecting portion being adapted when striking the water to deflect said release device to a position whereby the securing elements are released one from another.

4. In a casting apparatus adapted for use with fishing tackle including a leader, the combination of a deflector adapted to be attached to the leader, a disposable sinker, said sinker having a recess at the side thereof sloping diagonally inward toward the nearest end and a passage for the leader communicating between said end of the sinker and the recess, said deflector having a leader-engaging means near one edge thereof and having a length between said one edge and the opposite edge greater than the depth of the recess, whereby a portion of the deflector extends outwardly beyond the recess in a position adapted to strike the surface of the water when the cast is made thereby to effect release of the sinker from the deflector.

5. In a casting apparatus adapted for use with fishing tackle including a leader, the combination of a deflector on the leader and a disposable sinker, said deflector comprising a flat portion having an aperture near one edge adapted to engage the leader, and said sinker having transverse walls forming a recess on one side thereof near one end and an endward extending passage for the leader communicating between said one end of the sinker and the recess at the nearest wall, said nearest wall having a tilt outwardly and diagonally away from said one end of the sinker and having a breadth less than the breadth of the deflector between the edge adjacent the leader and the edge opposite thereto, whereby a portion of the deflector extends outwardly from the recess and is adapted for a striking engagement with the surface of the water when the cast is made thereby to release the sinker from the deflector.

6. In a casting apparatus adapted for use with fishing line and including a disposable sinker having a securing element comprising a looped extension thereon, a release device comprising a deflector plate having an attachment at one end thereof to the line, said deflector plate having a water-engaging face extending from said one end, and a releasable attachment on the deflector plate for the loop of the sinker, said releasable attachment comprising a hook on said water-engaging face of the deflector plate at a location nearer said one end than the end opposite thereto and facing said one end, and said deflector plate and said hook moving to a displaced position adapted to release the sinker when said deflector plate strikes the water.

7. A casting apparatus adapted for use with fishing tackle, said apparatus including a disposable sinker having a securing element thereon comprising an extension and a bead on the extension, a release device for said sinker comprising a deflector plate having a line-attaching eye adjacent one end and having a water-engaging portion extending from the eye and a recess in said water-engaging portion, said recess having an open end adapted to receive said bead and having a lateral slit extending from the open end adapted to receive the extension on the sinker, said recess being located nearer the end having the line-engaging eye than the end opposite therefrom, and resilient means in said recess depressible under application of weight of the sinker thereto and adapted to eject said bead therefrom upon the plunging of said sinker and release device into the water.

8. A casting apparatus comprising a deflector, a leader having a point of attachment to the deflector and a disposable casting weight having a deflector-engaging means thereon, said deflector having a weight engager portion adapted to engage the engaging means and remain in engagement therewith during casting operation while pull is exerted by the casting weight and on the deflector, said deflector having a deflecting portion extending from said weight engager portion toward an edge thereof a distance greater than the distance between the weight engager portion and said point of attachment of the leader and said deflecting portion being adapted upon striking a liquid surface to tilt the deflector to a new position wherein the engaging means is disengaged from the deflector.

References Cited in the file of this patent

UNITED STATES PATENTS

| Number | Name | Date |
|---|---|---|
| 196,648 | Edgar | Oct. 30, 1877 |
| 1,033,464 | Pomeroy | July 23, 1912 |
| 1,296,370 | Darling | Mar. 4, 1919 |
| 1,836,372 | Jordan | Dec. 15, 1931 |
| 2,230,751 | Johnson | Feb. 4, 1941 |
| 2,248,258 | Waldbillig | July 8, 1941 |
| 2,460,526 | Oliver et al. | Feb. 1, 1949 |

FOREIGN PATENTS

| Number | Country | Date |
|---|---|---|
| 846,240 | France | Sept. 12, 1939 |